United States Patent [19]

Lee

[11] Patent Number: 5,768,014
[45] Date of Patent: Jun. 16, 1998

[54] REAR PROJECTION SCREEN

[75] Inventor: Dong-Hee Lee, Seoul, Rep. of Korea

[73] Assignee: Daewoo Electronics Co., Ltd., Seoul, Rep. of Korea

[21] Appl. No.: 675,568

[22] Filed: Jul. 3, 1996

[30] Foreign Application Priority Data

Jul. 5, 1995 [KR] Rep. of Korea ............. 95-19559

[51] Int. Cl.$^6$ ........................................ G03B 21/56
[52] U.S. Cl. ............................................... 359/457
[58] Field of Search ........................ 359/443, 453, 359/454, 460

[56] References Cited

U.S. PATENT DOCUMENTS

| | | | |
|---|---|---|---|
| 4,468,092 | 8/1984 | Inoue | 350/128 |
| 4,525,029 | 6/1985 | Inoue | 350/128 |
| 4,573,764 | 3/1986 | Bradley | 350/128 |
| 4,701,202 | 10/1987 | Foster | 65/265 |
| 5,064,273 | 11/1991 | Lee | 359/457 |
| 5,085,497 | 2/1992 | Um | 359/848 |
| 5,111,337 | 5/1992 | Martinez | 359/443 |
| 5,126,836 | 6/1992 | Um | 358/60 |
| 5,159,225 | 10/1992 | Um | 310/328 |
| 5,175,465 | 12/1992 | Um | 310/328 |
| 5,581,407 | 12/1996 | Mitani et al. | 359/619 |
| 5,613,748 | 3/1997 | Yoshida et al. | 353/74 |
| 5,633,755 | 5/1997 | Manabe et al. | 359/443 |

*Primary Examiner*—Daniel P. Malley
*Attorney, Agent, or Firm*—Pennie & Edmonds LLP

[57] ABSTRACT

Disclosed is a rear projection screen having improved contrast and brightness. A screen for receiving an incident projection beam from a projection lens from a rear side of the screen and for transmitting the received light toward an observer is comprised. A fresnel lens for collimating the projection beam is included. The fresnel lens is formed on one side of the screen, where the projection beam from the projection lens is incident. A light absorbing layer for absorbing an external light incident into the screen and for reflecting a light incident from the fresnel lens is comprised. Also comprised is a light dispersing layer for dispersing the projection beam incident from a rear side of the screen and the reflected light from the light absorbing layer. The light absorbing layer and the light dispersing layer are formed on an observer's side of the screen. The screen has a one sheet structure having a novel light dispersing system. The manufacture of the screen is advantageous and the image reproduced on the screen is good quality.

4 Claims, 7 Drawing Sheets

REAR PROJECTION SCREEN

BACKGROUND OF THE INVENTION

1. Field of the Invention

The present invention relates to a rear projection screen, and more particularly, to a novel rear projection screen for a projector having a one sheet structure and a reproduced image of improved contrast and brightness.

2. Description of the Prior Art

Image display devices are classified according to a displaying method into direct viewing type image displays and projection type image displays. CRT (cathode ray tube), an example of the direct viewing type image display device, has a good quality image with high resolution. However, as the size of the screen of the CRT increases, the weight and the thickness thereof also increased and results in a device that is too large sized and too costly to manufacture. Accordingly, there's a disadvantage to accomplishing a device having a large sized screen.

As for the projection type image display devices, examples of this type include projectors, LCD (liquid crystal display) and PDP (plasma display panel). In this kind of device, a video source disposed at the rear side of the screen is projected along a projecting axis toward the screen to form an image on the surface of the screen and to distribute the image to the observers positioned in front of the screen. In contrast to the direct viewing type device, thin devices having large-sized screen can be advantageously accomplished in this projection type devices. However, problems such as low light efficiency and poor resolution of the image exist.

Especially, in the case of the LCDs, light loss due to a polarization layer is quite large. Further, as thin transistors for driving the LCD should be formed at each pixel and the increase of the aperture efficiency is limited, the light efficiency is very low.

A projector using an AMA (actuated mirror arrays) has been developed as a new projection type image display device by Aura Systems Inc. in America. See U.S. Pat. Nos. 5,126,836 & 5,159,225, both issued to Um and 5,085,497 & 5,175,465, both issued to Um et al.

In the AMA device, a plurality of mirrors are arranged so that they incline according to the applied electric field. By controlling the incident light from the light source to a predetermined angle utilizing the mirrors, an image can be reproduced on the screen. Generally, actuators formed under the mirrors are deformed by the electric field generated by an applied electric image signal and a voltage. If the actuators are deformed, the mirrors formed on the actuators become inclined. Finally, the inclined mirrors can reflect the incident light from the light source at a predetermined degree. As for the actuators for driving the mirrors, piezoelectric materials such as PZT ($Pb(Zr,Ti)O_3$), PLZT (($Pb$, $La)(Zr,Ti)O_3$), etc. and electrostrictive materials such as PMN ($Pb(Mg,Nb)O_3$) can be used. The reflected light from the mirrors passes through slits, a collimating lens and a projection lens onto the screen.

A projector using AMA may be divided into a one dimensional type and a two dimensional type. In the one dimensional type projector, mirrors are arranged by M×1 arrays, while in two dimensional type projector, mirrors are arranged by M×N arrays. In the projector using the one dimensional AMA, M×1 lights are scanned by using scanning mirrors, while in the projector using the two dimensional AMA, M×N lights are scanned to reproduce the image. This AMA projector has higher light efficiency than the LCD projector and recently, the AMA projector has attracted a lot of attention.

This projection type display utilizes a projection lens to enlarge the image reproduced on a small video source and to reproduce the image on a rear projection screen. The image quality of the rear projected image has been improved and so the displays are widely applied in domestic and industrial use. A great deal of research and development on improving the resolution and the light efficiency to obtain a wider viewing angle is being executed.

FIG. 1 is a schematic diagram of an LCD projector including the conventional rear projection screen for showing the operation of the image reproduction of the projection type display.

The LCD projector includes an LCD panel 12 as a video source, a projection lens 14 and a screen 10. Screen 10 is a rear projection type screen and is provided with a fresnel lens 10a at the projection lens side and a lenticular lens 10b at the side where an observer is. Reference numeral 16 refers to a light axis.

FIG. 2 is a schematic constitutional diagram of an AMA projector. This projector includes an AMA panel 22, a projection lens 24 and a screen 20. The screen also is provided with a fresnel lens 20a at the projection lens side and a lenticular lens 20b at the observer's side. Reference numeral 26 refers to a light axis.

In these two drawings, screens 10 and 20 are formed as one sheet from relatively transparent material. As for the base material, acryl resin, vinyl chloride resin, polycarbonate resin, olefin resin, styrene resin, etc. can be used. The screens are manufactured through extrusion press, heat compression, injection molding, etc. utilizing these resin materials.

In the screen, a diffuser such as silicon dioxide ($SiO_2$), calcium carbonate ($CaCO_3$), titanium trioxide ($TiO_3$), barium sulfate ($BaSO_4$), zinc oxide ($ZnO$), aluminum hydroxide ($Al(OH)_3$), fine powdered glass, etc. can be dispersed to increase the vertical and horizontal dispersibility of the incident light onto the screen. Differently, a dispersing layer is formed on the surface of the screen and sometimes, both the diffuser along with the dispersing layer are applied simultaneously.

Fresnel lenses 10a and 20a are formed in circular shapes when observed from the projection lens. Each lens functions as a field lens to projected image beams from projection lenses 14 and 24 to collimate the projected lights onto the screens toward the observer. The incident projected beams are somewhat dispersed by the diffuser or the dispersing layer. The concentration of the diffuser or the thickness of the screen are determined by the required viewing angle.

Lenticular lenses 10b and 20b which are the final path of the light, horizontally disperse the dispersed projected image beams even further to a desired horizontal viewing angle. Each lens is formed as a lenticulated surface where a plurality of small cylindrical lenses are continuously arranged. The screen having this type of lenticulated surface can disperse an incident light efficiently.

In the conventional projector having the above-mentioned structure, the total field beams of the video source is diverged by the projection lens. The diverged total field beams are transformed into parallel lights to have the same dispersing characteristics through the fresnel lens and to be dispersed vertically and horizontally through the diffuser and the lenticular lens. Thus, the observer can observe the reproduced projection image with a desired vertical and horizontal viewing angle.

In FIGS. 3A, 3B & 3C, various examples of screens for the LCD are illustrated. One side of the screens are formed of fresnel lens 10a having the same shape, while the other side of the screens are formed as various shapes of lenticular lenses 10b1, 10b2 and 10b3. That is, the screen is manufactured by using a resin having high transparency as a base material, adding a diffuser at random and then processing to form a fresnel lens at the projection lens side and to form various shapes of lenticular lenses at the observer's side.

Since the applied light amount is restricted, the lenticular lenses are used for limiting the diverging angle for to a certain brightness within a certain viewing angle. However, in the conventional rear projection screen as described above, a light loss due to a backward reflection through the addition of the diffuser and the formation of the dispersing layer reduces the total brightness of the screen. Moreover, when external light is incident into the lenticular lens, quite a lot of the light is reflected to deteriorate the contrast of the projected image from the observer's side.

In order to increase the contrast, black stripes for absorbing the external light are formed on the lenticular lens of the rear projection screen. See U.S. Pat. No. 5,064,273 issued to Lee and U.S. Pat. No. 4,525,029 issued to Inoue et al. Further, a rear projection screen for a color television having non-reflective black surfaces formed at the grooves between the lenticular lenses to reduce the reflection of the external light is disclosed in U.S. Pat. No. 4,701,202 issued to Bradley, Jr.

Besides the contrast deterioration, since the lenticular lenses have complex shapes as shown in FIGS. 3A, 3B & 3C, the manufacture thereof is very difficult and complicated. Moreover, the formation of the black stripes or the black surfaces also is very complicated to increase the manufacturing cost. In addition, the stripe shapes induce the generation of moire fringe.

There has been a great endeavor to widen the viewing angle. U.S. Pat. No. 4,468,092 issued to Inoue et al. discloses a rear projection screen having a wide viewing angle. Particularly, when there's a plurality of observers, they are usually positioned horizontally. Therefore, distribution of the light beams with a large horizontal angle is desired. This means that a horizontal viewing angle should be increased by improving the horizontal dispersibility of the light beams. In response to these requirements, studies on increasing the viewing angle also are carried out continuously.

SUMMARY OF THE INVENTION

To solve the problems of the conventional projector as described above, it is an object of the present invention to provide a rear projection screen having a novel light dispersing layer instead of a lenticular lens in order to obtain an image having improved contrast and brightness.

To accomplish the object, there is provided in the present invention a rear projection screen comprising:

- a screen for receiving an incident projection beam from a projection lens through a rear side of the screen and for transmitting the received light towards an observer;
- a fresnel lens for collimating the projection beam, the fresnel lens being formed on one side of the screen, where the projection beam from the projection lens is incident; and
- a light absorbing means for absorbing an external light incident into the screen and for reflecting a light incident from the fresnel lens, and a light dispersing means for dispersing the projection beam incident from a rear side of the screen and the reflected light from the light absorbing means, the light absorbing means and the light dispersing means being formed on an observer's side of the screen.

Particularly, the light absorbing means gradually narrows into a predetermined vertical angle in the screen, and two surfaces formed in the screen are reflecting surfaces for reflecting incident lights thereunto from the fresnel lens. More preferably, the two reflecting surfaces are total reflecting surfaces and so vertical angle formed between the two total reflecting surfaces of the light absorbing means is in the range of the following equation.

$$\phi < 2\theta_{TIR} = \pi - 2 \arcsin(n_a/n_b)$$

(wherein, $\phi$ represents the vertical angle between the reflecting surfaces, $\theta_{TIR}$ represents a total internal reflection angle, $n_a$ represents a refractive index of the screen and $n_b$ represents a refractive index of the reflecting surfaces of the light absorbing means)

Preferably, the light absorbing means on an observer's side is black-colored for advantageously absorbing the external light and the total reflecting surfaces of the light absorbing means are manufactured by coating the light absorbing means with a resin to give them smooth surfaces. The surface of the light absorbing means on the observer's side of the screen and the light dispersing layer are preferably on a plane. The light absorbing means can be formed from a black absorbing body or can comprise essentially of light absorbing particles.

It is desired that a plurality of the light absorbing means are formed alternately with the light dispersing layer at a predetermined distance on the observer's side in one layer, and that neighboring layers overlap in a shifted position. More preferably, the layers overlap to result in a screen having a checkered pattern.

As for the light dispersing layer, a fine-mat-surface formed by carving fine grooves in a matrix shape into the surface of the screen is preferred to obtain high efficiency of light dispersibility.

The rear projection screen of the present invention is provided with a fresnel lens on the projection lens side, and with a black absorbing body having total reflecting surfaces in the screen and a black coated layer in front of the screen and an alternately formed light dispersing layer on the observer's side. The screen has a simplified projection structure and improved contrast and brightness. Further, dispersibility of the screen is good.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, the constituting elements and the operation principles of the rear projection screen according to preferred embodiments of the present invention will be explained in more detail with reference to the accompanying drawings.

Figure 1:
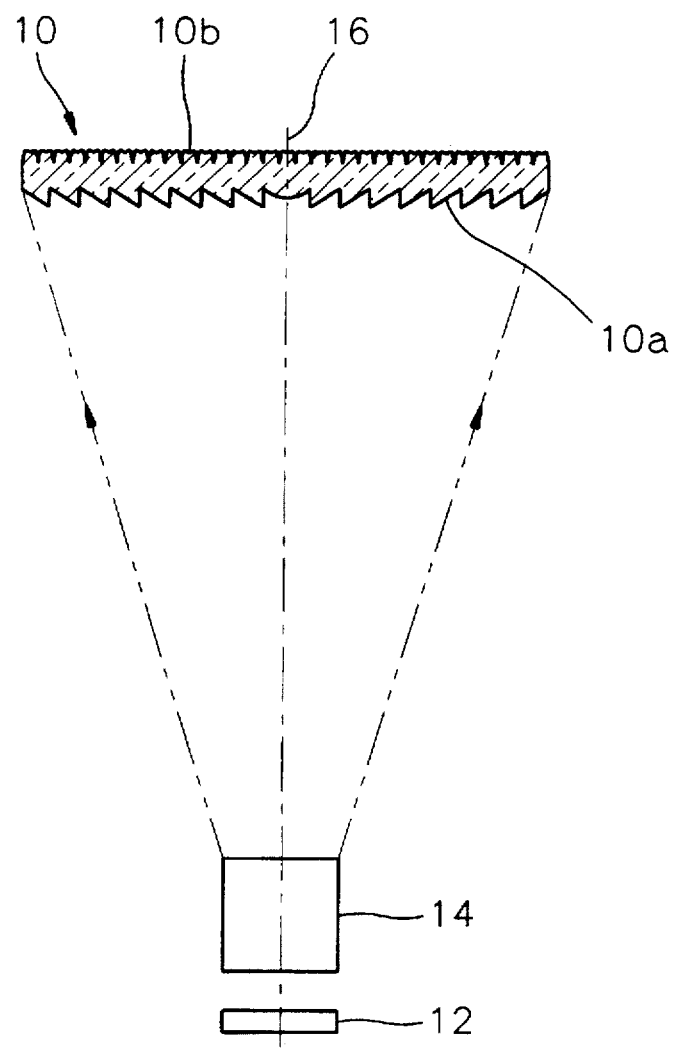
FIG. 1 is a schematic diagram of an LCD projector including the conventional rear projection screen.
Figure 2:
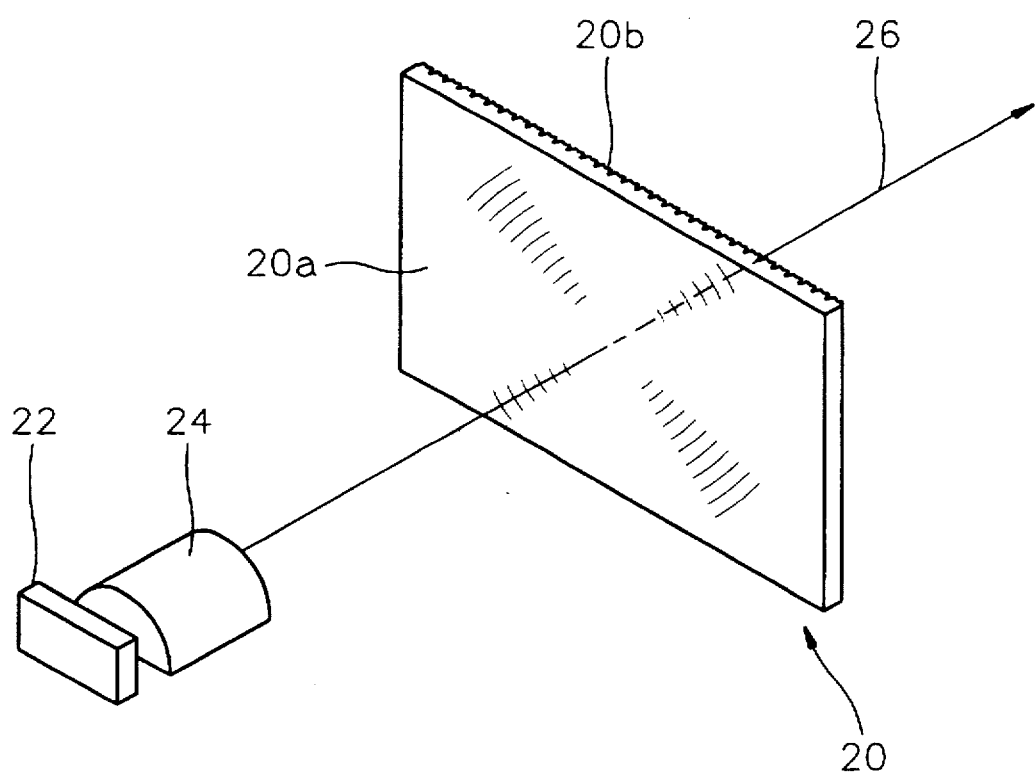
FIG. 2 is a schematic diagram of an AMA projector including the conventional rear projection screen.
Figure 3A:
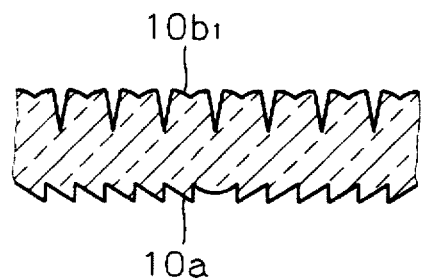
FIGS. 3A, 3B & 3C are enlarged conventional rear projection screens having a fresnel lens formed on one side thereof and various types of lenticular lenses formed on the other side thereof.
Figure 3B:
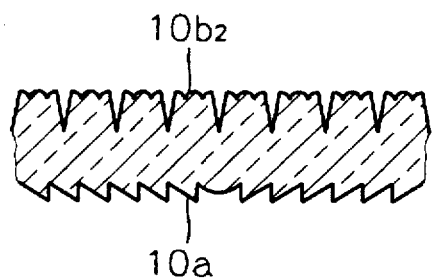
Figure 3C:
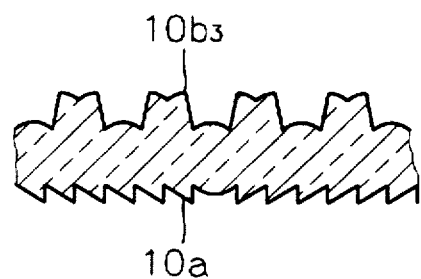
Figure 4:
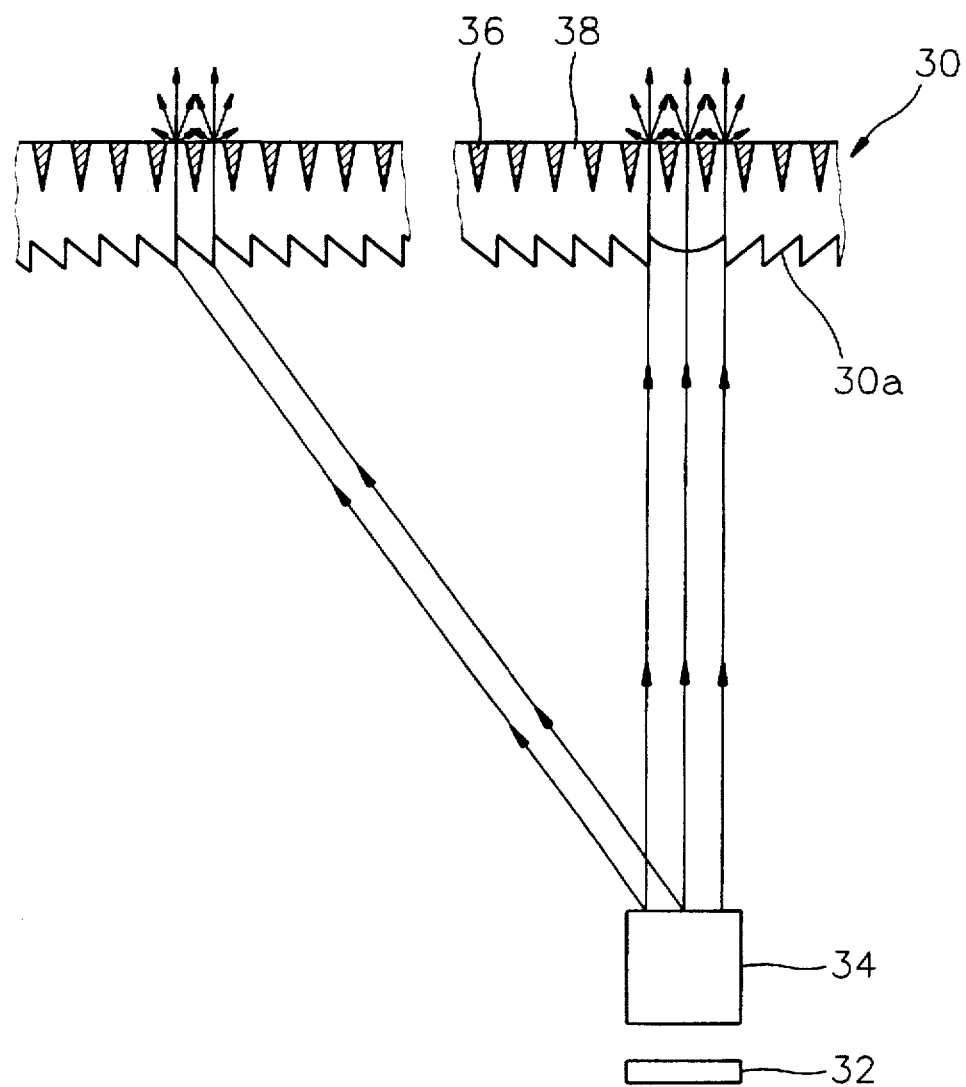
FIG. 4 is a schematic diagram of a projector including a rear projection screen according to the present invention.

In FIG. 4, an embodiment of a projector including a rear projection screen according to the present invention is schematically illustrated. This projector utilizes an AMA and the light passages are also designated.

First, the projector schematically includes an AMA panel 32, a projection lens 34 and a screen 30. A fresnel lens 30a is formed on screen 30 toward projection lens 34. On an observer's side of screen 30, a black absorbing body 36 and a fine-mat-surface 38 are formed instead of a lenticular lens. The cross section of black absorbing body 36 forms an isosceles triangle and is formed alternately with the fine-mat-surface. The projected beam from the projection lens passes through the fresnel lens onto the screen. Then the transformed parallel light is dispersed vertically and horizontally at the fine-mat-surface formed on the surface of the screen.

The surface of the fine-mat-surface is formed from fine matrix grooves to give good efficiency in light dispersing. In the screen of the present invention, since sufficient dispersibility can be obtained through the fine-mat-surface, the conventional diffuser may not included. On the contrary, when considering the side effect of deterioration on light efficiency due to the backward reflection, it is preferred that the diffuser is not added.

Figure 5:
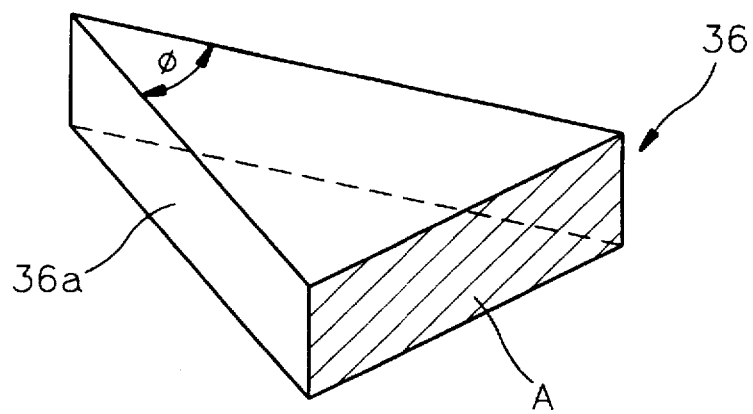
FIG. 5 is an enlarged view of a black absorbing body which is one element of a rear projection screen according to the present invention.

FIG. 5 is an enlarged perspective view of black absorbing body 36. The black absorbing body on the whole forms a triangular prism. A surface A which faces the observer is black-colored for advantageously absorbing the external light. On the contrary, inclined total reflecting surfaces 36a are formed into screen 30 with a predetermined vertical angle $\phi$. The surfaces are smooth or coated to be smooth for totally reflecting the incident light thereunto. The light passing through the fresnel lens and incident into the black absorbing body is totally reflected by the total reflecting surfaces toward the fine-mat-surface. Therefore, almost all the incident light from the projection lens to the screen is transmitted through the fine-mat-surface to the front of the screen.

Figure 6:
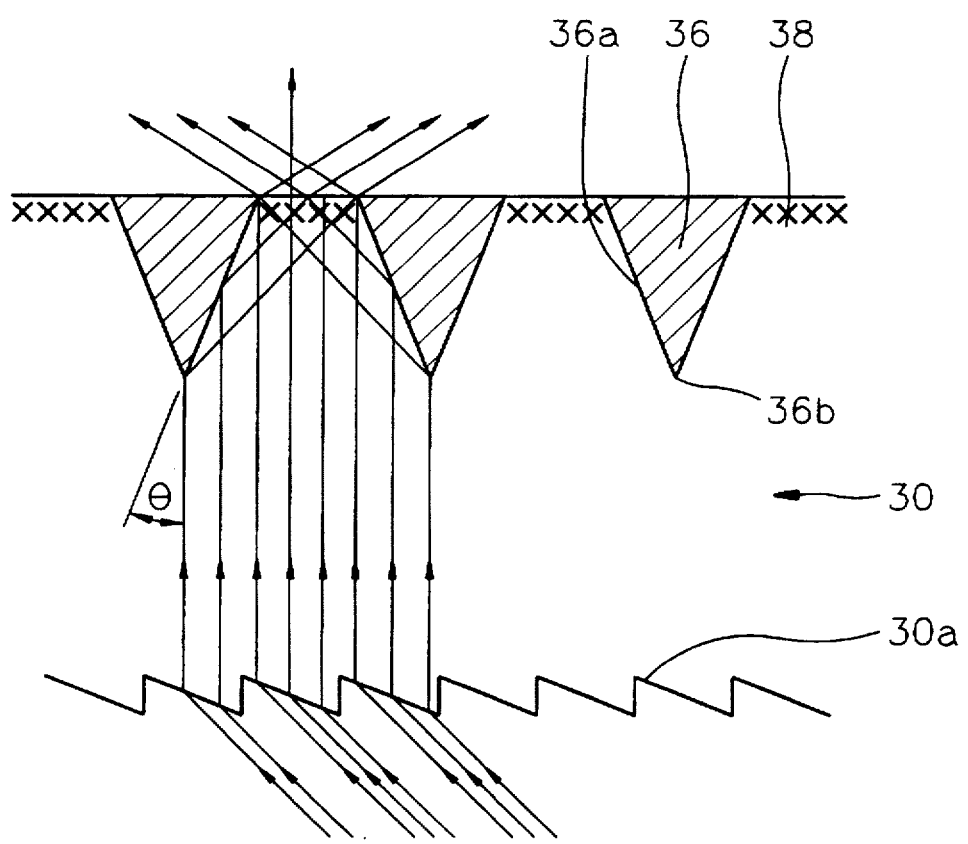
FIG. 6 illustrates the light path passing through a rear projection screen according to the present invention.

In FIG. 6, the light path running to total reflecting surfaces 36a of black absorbing body 36 is illustrated in detail. The incident light beam into screen 30 is collimated by fresnel lens 30a toward the observer. The fine-mat-surface transmits the incident light beam toward the outside of the screen. The light beam incident into the black absorbing body is reflected by the total reflecting surface toward the transparent fine-mat-surface, thereby being dispersed toward the observer. Accordingly, the whole incident beam into the screen is dispersed at the fine-mat-surface.

In FIGS. 5 & 6, the angle between the vertically incident light from the fresnel lens of the screen and the total reflecting surface is given as $\theta$, the refractive index of the transparent screen is given as $n_a$ and the refractive index of the total reflecting surface of the black absorbing body is given as $n_b$. For the total reflection, the relation of $n_a > n_b$ should be satisfied and so the total internal reflection $\theta_{TIR}$ can be obtained as follows:

$$\theta_{TIR} = \pi - 2\arcsin(N_a/n_b)$$

Accordingly, the black absorbing body should be manufactured so as to have an angle $\theta$ smaller than the angle $\theta_{TIR}$ for total reflection. When the internal vertical angle of the black absorbing body is given as $\phi$, the equation $\phi=\theta$ is satisfied. Hence, the angle $\phi$ should be satisfied by the following equation:

$$\phi = 2\theta_{TIR} = \pi - 2 \arcsin(n_a/n_b)$$

That is, the internal vertical angle of the black absorbing body can be determined by the refractive indices of the transparent portion of the screen and the total reflecting surface of the black absorbing body.

Figure 7:
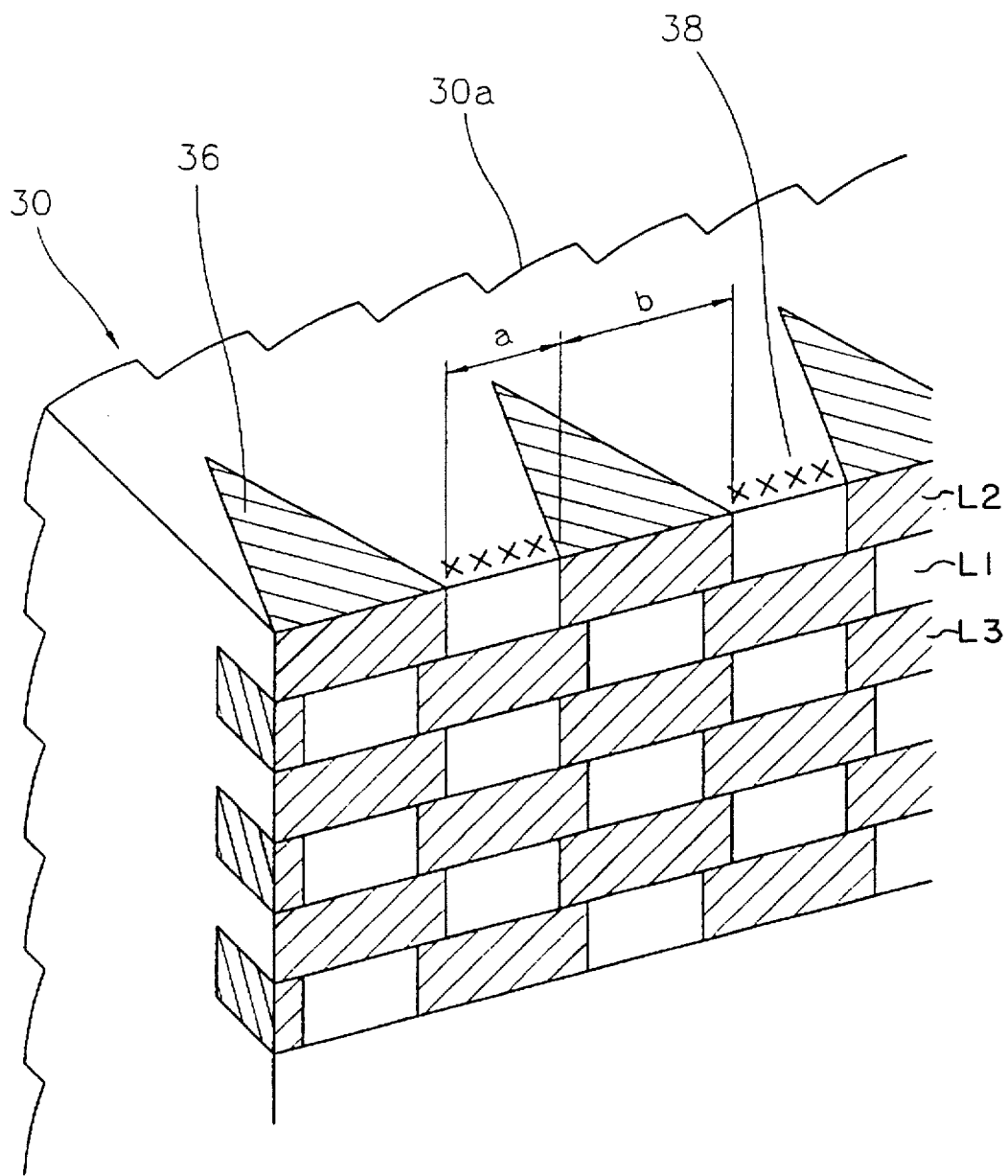
FIG. 7 is a partial perspective view of a rear projection screen according to the present invention from an observer for showing the arrangement of the black absorbing body.

FIG. 7 is a partial perspective view of the rear projection screen according to the present invention. Fresnel lens 30a is formed on the projection beam incident side of the screen and black absorbing body 36 and fine-mat-surface 38 are formed on the observer's side, as shown in the drawing. A plurality of black absorbing bodies are arranged alternately with the fine-mat-surface at a predetermined distance in a layer L1. Particularly, the neighboring layers L2 and L3 overlap the layer L1; to result in a screen with a checkered pattern. The incident light into the screen from the projection lens is dispersed during the passage through the fine-mat-surface to all different directions. The external light is absorbed by the black absorbing body.

The absorbing amount of the external light can be controlled by the width of fine-mat-surface 38, "a", which is the transmitting portion and the width of black absorbing body 36, "b", formed on the observer's side. When the preferred ratio of the widths of the transmitting portion and the black absorbing body are given and the angle "$\theta$" is given as an appropriate value, the depth, "d", of the black absorbing body can be calculated.

Figure 8:
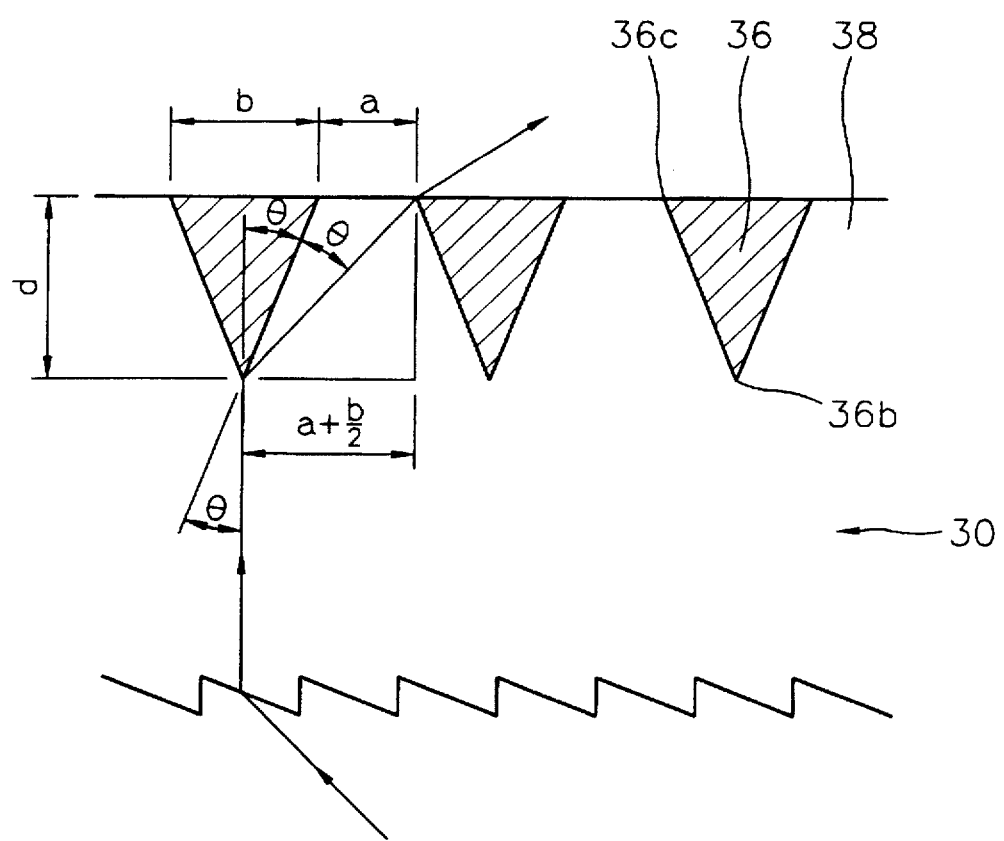
FIG. 8 is a diagram for showing the prosecution of determining the widths of a dispersing layer and a black absorbing body.

FIG. 8 is a diagram for showing the prosecution of determining the widths of a dispersing layer and a black absorbing body.

In this drawing, it is shown that when the totally reflected light of the critical beam incident into an apex 36b of black absorbing body 36 from the fresnel lens passes an edge 36c of the neighboring black absorbing body, the light efficiency is at its maximum as there is no light loss. When the light beam incident into the apex is totally reflected to the edge portion of the neighboring black absorbing body, the values "a" and "b" can be represented by the incident angle "$\theta$" and the depth, "d", of the black absorbing body as follows.

First, from the drawing, $$b = 2d \tan \theta \quad (1)$$

$$d = (a+b/2) \tan(\pi/2 - 2\theta)$$

if equation (1) is substituted, $$d = (a+d \tan \theta) \tan(\pi/2 - 2\theta)$$

$$d = (a+d \tan \theta) \cot 2\theta$$

$$d \tan 2\theta = a + d \tan \theta$$

$$a = d \tan 2\theta - d \tan \theta$$

$$a=d\{2\tan\theta/(1-\tan^2\theta)-\tan\theta\}$$

$$a=d\tan\theta\{(1+\tan^2\theta)/(1-\tan^2\theta)\}$$

$$a=d\tan\theta\sec2\theta \quad (2)$$

From the equations (1) and (2), "a" and "b" can be represented by the parameters "θ" and "d".

The pitches of the lenticular lenses usually are given as 0.8 mm, 1.0 mm and 1.2 mm. In the present invention, the sum of the values "a" and "b" are preferably given as the above mentioned pitch, "P", and "a" and "b" are set as the same value. Then, the vertical angle formed by the total reflecting surfaces and the depth of the black absorbing body can be calculated. From the equation of $$a/b=1=1/(1-\tan^2\theta)-\tfrac{1}{2},$$

θ=30°. From the incident angle, the depth of the black absorbing body can be calculated. In the case of having the above-mentioned pitch values, the parameters are obtained and illustrated in Table 1.

TABLE 1

| P(mm) | a(mm) | b(mm) | θ | d(mm) |
|---|---|---|---|---|
| 0.8 | 0.4 | 0.4 | 30° | 0.346 |
| 1.0 | 0.5 | 0.5 | 30° | 0.433 |
| 1.2 | 0.6 | 0.6 | 30° | 0.520 |

Various-sized screens having various values for the constituting elements besides the above given values, can be manufactured according to the pitch value and the ratio of the width of the fine-mat-surface to the width of the black absorbing body. The size depends on the material used for the base sheet, the applied projector, etc. Accordingly, the size can be determined as occasion demands. In the table, "a" and "b" are given as the same value. According to the experiment executed by the present inventor, the contrast of the image was improved further as the width of the black absorbing body was widened. Considering the contrast effect and the dispersibility, optimized image can be obtained when "b" is somewhat larger than "a".

The screen according to the present invention can be manufactured by various methods. For example, the screen, except for the black absorbing body is manufactured by the conventional methods such as extrusion press, heat compression and injection molding. Then a plurality of the black absorbing body having triangular prism forms are manufactured and the total reflecting surfaces are coated with resin. The completed black absorbing bodies are arranged at equal distances between the grooves formed on the screen, and are attached thereto by means of a binder. As for the binder, vinyl acetate, acryl binder, urethane binder, butyl rubber, ethylene-vinyl acetate binder, etc. can be used. Since ethylene-vinyl acetate binder has high transparency, it is preferred.

As a different method, the screen, except for the black absorbing body is manufactured as described above. Then portion of the screen where the total reflecting surface is formed is coated with resin. After that, the groove portions where the black absorbing body should be formed are filled with an absorbing agent including light absorbing particles and the binder. After drying the agent, the surface of the screen is polished to complete the fine-mat-surface and the black absorbing layer.

In the rear projection screen manufactured by the above described methods, horizontal dispersion of the light beam by the total reflecting surface of the black absorbing body can be generated. Further, vertical and horizontal dispersions by the fine-mat-surface are generated to provide appropriate vertical and horizontal viewing angles for the observer. The external light incident into the screen from the observer's side can be absorbed by the black absorbing body formed in the front part of the screen. Accordingly, the amount of reflection of the external light at the screen can be largely reduced to improve the contrast of the projection beam with respect to the external light of the screen.

If the black absorbing body and the fine-mat-surfaces are alternately formed in one layer and neighboring layers overlap to result in a screen having checkered pattern as shown in FIG. 7, then the problem of generation of the moire fringe can be eliminated. The moire fringe is generated in the conventional screen between the vertically arranged lenticular lenses and projecting pixels. This fringe could not be eliminated by the conventional screen having black stripes. The effect on the elimination of the moire fringe can be obtained when the neighboring layers overlap in somewhat shifted position.

Since the screen of the present invention has a one sheet structure and a fine-mat-surface, since and the black absorbing body is formed in a plane, the screen has a simplified structure. Therefore, the manufacture of the screen is very advantageous and the manufacturing cost thereof can be reduced.

The above-mentioned effects can be obtained from any rear projection type display by which visible display can be illustrated, including the conventional CRT or LCD type rear projection type optical system. However, when the screen is applied to an AMA type rear projection system having good light efficiency, even better effects on image quality, viewing angle, etc. can be obtained.

Although the preferred embodiments of the invention have been described, it is understood that the present invention should not be limited to these preferred embodiments, but various changes and modifications can be made by one skilled in the art within the spirit and scope of the invention as hereinafter claimed.

What is claimed is:

1. A rear projection screen for a projector comprising:
    a transparent screen for receiving an incident projection beam from a projection lens from a rear side of said screen and for transmitting said received light toward an observer;
    a fresnel lens for collimating said projection beam, said fresnel lens being formed on one side of said screen where said projection beam from said projection lens is incident;
    a black absorbing body for absorbing an external light incident to said screen and for reflecting a light incident from said fresnel lens, said black absorbing body forming a triangular prism which is gradually narrowed from the observer's side towards the fresnel lens so as to have a predetermined angle in said screen, said absorbing body having two inclined surfaces formed in said screen being reflecting surfaces for reflecting incident lights thereunto; and
    a fine-mat-surface for dispensing said projection beam incident from a rear side of said screen and said reflected light reflected from the inclined surfaces of said black absorbing body,
    wherein said block absorbing body and said fine-mat-surface are formed on an observer's side of said screen, and
    wherein a surface of said black absorbing body on said observer's side of said screen and said fine-mat-surface are in a plane, and said black absorbing body and said fine-mat-surface are alternately formed in a layer, and neighboring layers, which include neighboring absorbing bodies and neighboring fine-mat-surfaces, partially overlap the layer to result in a screen having a checkered pattern.

2. A rear projection screen as claimed in claim 1, wherein said angle formed by said two reflecting surfaces of said black absorbing body is in the range of the following equation:

$$\phi < 2\theta_{TIR} = \pi - 2 \arcsin(n_a/n_b)$$

wherein, $\phi$ represents said vertical angle between said reflecting surfaces, $\theta_{TIR}$ represents a total internal reflection angle, $n_a$ represents a refractive index of said screen and $n_b$ represents a refractive index of said reflecting surfaces of said light absorbing means.

3. A rear projection screen as claimed in claim 1, wherein a width of said fine-mat-surface, "a", and a width of said black absorbing body, "b", are represented by the following equations:

$$a = d\tan\theta \sec 2\theta$$

$$b = 2d \tan\theta$$

wherein, "d" represents the height from the surface of an observer's side of said black absorbing body to said vertical angle and "θ" represents half of said vertical angle.

4. A rear projection screen as claimed in claim 3, wherein said width of said fine-mat-surface, and said width of said black absorbing body are the same.

* * * * *